（12） United States Patent
Gieseke (10) Patent No.: US 7,873,471 B2
(45) Date of Patent: Jan. 18, 2011

(54) TRANSMISSION OF SPECIAL ROUTES TO A NAVIGATION DEVICE

(75) Inventor: Arnold Gieseke, Giesen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1459 days.

(21) Appl. No.: 10/531,338

(22) PCT Filed: Jul. 16, 2003

(86) PCT No.: PCT/US03/22225

§ 371 (c)(1),
(2), (4) Date: Apr. 14, 2005

(87) PCT Pub. No.: WO2005/017455

PCT Pub. Date: Feb. 24, 2005

(65) Prior Publication Data

US 2006/0015249 A1    Jan. 19, 2006

(51) Int. Cl.
*G01C 21/30*    (2006.01)
*G01C 21/32*    (2006.01)

(52) U.S. Cl. .................. 701/210; 701/202; 701/212; 701/213; 340/995.21; 340/995.12

(58) Field of Classification Search ............ 340/995.21, 340/995.1, 995.19, 995.12; 701/209–210
See application file for complete search history.

(56) References Cited

U.S. PATENT DOCUMENTS

| | | | | |
|---|---|---|---|---|
| 4,879,658 A | * | 11/1989 | Takashima et al. .......... | 701/209 |
| 5,128,874 A | * | 7/1992 | Bhanu et al. ............... | 701/301 |
| 5,177,685 A | * | 1/1993 | Davis et al. ............... | 455/456.5 |
| 5,353,034 A | * | 10/1994 | Sato et al. | |
| 5,559,707 A | | 9/1996 | DeLorme et al. ............ | 364/443 |
| 5,742,922 A | * | 4/1998 | Kim ........................... | 701/201 |
| 5,787,383 A | * | 7/1998 | Moroto et al. .............. | 701/210 |
| 5,902,349 A | * | 5/1999 | Endo et al. ................. | 701/202 |
| 5,936,631 A | * | 8/1999 | Yano et al. ................. | 345/428 |
| 6,026,346 A | * | 2/2000 | Ohashi et al. .............. | 701/210 |

(Continued)

FOREIGN PATENT DOCUMENTS

EP    0854463 A2    7/1998

(Continued)

OTHER PUBLICATIONS

The well-known Internet's MapQuest.com.*

(Continued)

*Primary Examiner*—Cuong H Nguyen
(74) *Attorney, Agent, or Firm*—Brinks Hofer Gilson and Lione (57) ABSTRACT

A vehicle navigation system includes an adaptive routing module (210) that allows a user to provide inputs that influence routes that are calculated to predetermined destinations. A route calculation module (204) executed by a navigation server (102) is operable to calculate a first route from the trip origin to the trip destination. An adaptive route calculation (204) executed by the navigation server (102) is operable to allow the user to enter a user modification of the first route. After the user modification is entered by the user, a second route to the trip destination is calculated as a function of the user modification. The second route is then transmitted to a vehicle navigation system (104).

21 Claims, 6 Drawing Sheets

U.S. PATENT DOCUMENTS

| | | | |
|---|---|---|---|
| 6,034,626 A | 3/2000 | Maekawa et al. | 340/995 |
| 6,061,629 A * | 5/2000 | Yano et al. | 701/209 |
| 6,118,389 A * | 9/2000 | Kamada et al. | 340/995.21 |
| 6,119,095 A * | 9/2000 | Morita | 705/5 |
| 6,175,805 B1 | 1/2001 | Abe | 701/209 |
| 6,266,613 B1 * | 7/2001 | Nimura et al. | 701/210 |
| 6,278,935 B1 * | 8/2001 | Kaplan et al. | 701/200 |
| 6,317,685 B1 * | 11/2001 | Kozak et al. | 701/210 |
| 6,362,751 B1 | 3/2002 | Upparapalli | 340/995 |
| 6,411,897 B1 * | 6/2002 | Gaspard | |
| 6,480,783 B1 * | 11/2002 | Myr | 701/117 |
| 6,542,811 B2 | 4/2003 | Doi | 701/200 |
| 6,591,188 B1 * | 7/2003 | Ohler | 701/209 |
| 6,678,611 B2 * | 1/2004 | Khavakh et al. | 701/210 |
| 6,801,763 B2 * | 10/2004 | Elsey et al. | 455/404.1 |
| 6,917,644 B2 * | 7/2005 | Cahn et al. | 375/142 |
| 6,961,658 B2 * | 11/2005 | Ohler | 701/209 |
| 7,035,733 B1 * | 4/2006 | Alwar et al. | 701/210 |
| 7,099,773 B2 * | 8/2006 | Linn | 701/210 |
| 7,239,962 B2 * | 7/2007 | Plutowski | |
| 7,398,154 B2 * | 7/2008 | Phuyal et al. | 701/208 |
| 7,406,665 B2 * | 7/2008 | Yokota | |
| 7,421,321 B2 * | 9/2008 | Breed et al. | 701/29 |
| 2001/0029425 A1 * | 10/2001 | Myr | 701/200 |
| 2001/0047241 A1 * | 11/2001 | Khavakh et al. | 701/209 |
| 2002/0077746 A1 * | 6/2002 | Zuber et al. | 701/209 |
| 2002/0105549 A1 * | 8/2002 | Yokota | 345/824 |
| 2002/0128766 A1 * | 9/2002 | Petzold et al. | 701/201 |
| 2002/0140745 A1 * | 10/2002 | Ellenby et al. | 345/848 |
| 2003/0015358 A1 * | 1/2003 | Abe et al. | 180/65.3 |
| 2003/0028319 A1 * | 2/2003 | Khavakh et al. | 701/209 |
| 2004/0204829 A1 * | 10/2004 | Endo et al. | 701/202 |
| 2005/0102102 A1 * | 5/2005 | Linn | 701/210 |
| 2005/0125146 A1 * | 6/2005 | Phuyal et al. | 701/208 |
| 2005/0273218 A1 * | 12/2005 | Breed et al. | 701/2 |
| 2006/0015249 A1 * | 1/2006 | Gieseke | 701/210 |
| 2006/0031009 A1 * | 2/2006 | Brulle-Drews | 701/209 |
| 2006/0255960 A1 * | 11/2006 | Uken et al. | 340/815.4 |

FOREIGN PATENT DOCUMENTS

| | | |
|---|---|---|
| JP | 08-105752 | 4/1996 |
| JP | 09-101163 | 4/1997 |
| JP | 11-219500 | 8/1999 |
| JP | 2000-088594 | 3/2000 |
| JP | 2002-019489 | 1/2002 |
| JP | 2002048559 A * | 2/2002 |
| JP | 2002-318124 | 10/2002 |
| JP | 2002340584 A * | 11/2002 |
| JP | 2003307425 A * | 10/2003 |
| JP | 2004037413 A * | 2/2004 |
| JP | 2007218642 A * | 8/2007 |
| JP | 2008122232 A * | 5/2008 |
| JP | 2009019902 A * | 1/2009 |

OTHER PUBLICATIONS

The well-known Internet's Google.com on mapping and navigation website.*
America Online, "GPS at the Fingertips of Car Owners", Apr. 1995.*
America Online, "Combines the Cellular Network with Global Positioning", Apr. 1995.*
Map Building Using Cheap Digital Cameras; Taylor, Trevor; Boles, Wageeh W.; Geva, Shlomo; Digital Image Computing Techniques and Applications, 9th Biennial Conference of the Australian Pattern Recognition Society on Dec. 3-5, 2007 pp. 130-137; Digital Object Identifier 10.1109/DICTA.2007.4426787.*
Bae, Hong S.; Ryu, Jihan; Gerdes, J. Christian, "Road Grade and Vehicle Parameter Estimation for Longitudinal Control Using GPS", 2001 IEEE Intelligent Transportation Systems Conference Proceedings-Oakland (CA). Aug. 25-29, 1991, pp. 168-173.*
Autonomous mobile robot navigation and learning; Weisbin, C.R.; de Saussure, G.; Einstein, J.R.; Pin, F.G.; Heer, E.; Computer vol. 22, Issue 6, Jun. 1989 pp. 29-35; Digital Object Identifier 10.1109/2.30718.*
The measurement and use of registered reflectance and range data in scene analysis.quadrature..quadrature.Nitzan, D.; Brain, A.E.; Duda, R.O.;.quadrature..quadrature.Proceedings of the IEEE.quadrature..quadrature.vol. 65, Issue 2, Feb. 1977 pp. 206-220.*
Single camera lane detection and tracking; Schreiber, D.; Alefs, B.; Clabian, M.; Intelligent Transportation Systems, 2005. Proceedings. 2005 IEEE Sep. 13-15, 2005 pp. 302-307; Digital Object Identifier 10.1109/ITSC.2005.1520207.*
Automatic lane following with a single camera; Sukhan Lee; Boo, K.S.; Dongmok Shin; Lee, D.H.; Robotics and Automation, 1998. Proceedings. 1998 IEEE International Conference on; vol. 2, May 16-20, 1998 pp. 1689-1694 vol. 2 Digital Object Identifier 10.1109/ROBOT.1998.677404.*
Patent Cooperation Treaty International Search Report, PCT/US03/22225, filed Jul. 16, 2003.
Japanese Office Action dated Mar. 19, 2009, (4 pgs.) and English Translation (5 pgs.).
Chinese Office Action dated Nov. 21, 2008 (17 pgs.) and English Translation (19 pgs.).
Chinese Office Action dated Jan. 25, 2008.
Japanese Office Action dated Dec. 15, 2009, in JP 2005-507809 (4 pgs.) and English Translation (7 pgs.).
Chinese Office Action of Dec. 4, 2009, in CN 038256258 (19 pgs.) in English.

* cited by examiner

TRANSMISSION OF SPECIAL ROUTES TO A NAVIGATION DEVICE

BACKGROUND OF THE INVENTION

1. Technical Field

This invention relates generally to vehicle navigation systems and, more particularly, to using special routes in a vehicle navigation system.

2. Related Art

Vehicle navigation systems are becoming increasingly popular in the automobile industry. A typical vehicle navigation system includes a global positioning system ("GPS") receiver that is mounted somewhere on the vehicle. The GPS receiver is capable of communicating with a satellite-based global positioning system or other localized positioning systems. The GPS receiver obtains position information that is converted into some form of display for the vehicle operator indicating the position of the vehicle relative to previously determined reference points or other known landmarks on a given map database.

The typical vehicle navigation system also includes a digital map database module that includes digitized map information that can be processed by a navigation computer designed to handle map-related functions. A map matching module is used to match the position or trajectory measured by a positioning module to a position associated with a location or route on a map provided from the digital map database. The positioning module receives its information from the GPS receiver.

A route planning module is also typically included that is used to help vehicle drivers plan a route prior to, or during, a trip. One commonly used technique is to find a minimum-travel-cost route, which is designed to minimize the amount of distance traveled and costs associated with reaching a predetermined destination. Other techniques exist that integrate the time one needs if using dedicated roads or may use information about traffic conditions on the route to calculate a route that avoids the traffic condition. A route guidance module is also included that is used to guide the driver along the route generated by the route planning module. Guidance can be given, either before the trip, or in real time while en-route. The real time or en-route guidance is typically generated using optical driver recommendations and/or acoustic driver recommendations.

The typical vehicle navigation system also includes a human-machine interface module that provides users with a way to interact with the location and navigation computer and devices. A visual display is typically used to convert signals into a visual image in real time for direct interpretation by the user. As such, displays are used to provide the optical driver recommendations. The display itself is typically an electro-optical device such as a liquid crystal display ("LCD"), a cathode-ray tube ("CRT") display, an electroluminescent display ("ELD"), a heads-up display ("HUD"), a plasma display panel ("PDP"), a vacuum fluorescent display ("VFD"), or a touch-screen display.

The human-machine interface module may also include a voice-based interface that allows the user to interact with vehicle navigation system. The acoustic driver recommendations are provided using the voice-based interface. Speech is the most common interface that is used for delivering acoustic driver recommendations because it provides a natural interface that does not distract the driver from operating the vehicle and/or paying attention to the roadway. As such, information provided through acoustic driver recommendations may be safer because it allows the vehicle operator to concentrate on the task of driving.

During operation, the user may enter a trip destination into the vehicle navigation system because the vehicle navigation system may calculate a route based on the current position of the vehicle. The vehicle navigation system will then calculate an optimal route from the origin to the destination and display the optimal route to the user on a display. The user of the vehicle navigation system does not have any influence over the choice of the route to be selected or calculated by the navigation system to the destination. The user could choose not to follow the selected route. However, the user may want to vary the selected route based on user concerns or needs not taken into consideration by the navigation system.

Several types of vehicles may not be allowed to travel on certain routes calculated by the vehicle navigation system. For example, wide-body trucks may not be able to travel on narrow roads or inner city streets. Heavy transport vehicles or trucks may not be able to traverse over particular bridges or roads that cannot support the weight of the load being carried by the truck. In addition, trucks that are taller or carrying a tall load may not be able to fit underneath bridges along a roadway. As such, a need exists for a vehicle navigation system that will allow the user of the vehicle to have some influence over the route that is calculated to the destination based on predetermined characteristics.

SUMMARY

A navigation system includes an adaptive routing module that allows a user to provide inputs that influence routes that are calculated to trip destinations. The navigation system includes a navigation server in communication with a vehicle navigation system in a vehicle. The navigation server may include a display that is connected with an input device. The vehicle navigation system may include a control unit that may also be connected with an input device and a display. The input device on the navigation server may enable a user to enter a trip origin and a trip destination so that a route to the trip destination may be calculated by a route calculation module included in the navigation server.

The trip origin may already be known by the navigation system based on the position of the vehicle and therefore may not be required. The route calculation module may be executed by the navigation server may calculate a first optimal route from the trip origin to the trip destination. An adaptive route calculation module executed by the control unit allows the user to enter a user modification of the first route with the input device. After the user modification is entered by the user, a second optimal route to the trip destination may be calculated as a function of the modifications entered by the user. Once the second optimal route has been obtained, the second optimal route may be transmitted wirelessly to the vehicle navigation system.

A display may be connected with the control unit of the vehicle navigation system for generating a graphical user interface ("GUI") that is capable of displaying a road network map. A user interface module executable by the control unit may display the second optimal route on a road network map generated on the display. The road network map may include a plurality of nodes and a plurality of segments, which may otherwise be referred to as map elements, that make up roads and intersections on the road network map. The driver may travel to the destination using the vehicle navigation system, which guides the driver to the destination using the GUI and possibly audible commands or notifications.

The user modifications entered in the navigation server may include closing or selecting at least one node in the road network map. The closed nodes may be avoided by the second optimal route that is calculated and presented to the user and the selected nodes may be included in the second optimal route. The user modification may also include closing or selecting at least one segment in the road network map. As such, the closed segments may be avoided by the second optimal route that is calculated and presented to the user and the selected segments may be included in the second optimal route. The user modifications may also be entered as a function of vehicle characteristics. The vehicle characteristics may be based on several different factors such as the type of vehicle, the type of cargo and so forth.

The display and the input device in the vehicle navigation system may comprise a touch-screen display. The adaptive routing module may also be located in the vehicle navigation system, which allows the user to close or select nodes or segments using a GUI of the road network map that is generated on the display. In addition, the touch-screen display may enable the user to close or select nodes or segments using the GUI of the road network map that is generated on the touch-screen display. Once the second optimal route is calculated, it may be stored in a memory location that is associated with the control unit, such as on a hard disc drive.

A method of generating routes in a vehicle navigation system is also disclosed. An optimal route to a predetermined destination is generated using a road network map that includes a plurality of nodes and segments. A user is then allowed to provide or enter a user modification of the first optimal route. Once the user modification is entered, a second optimal route is calculated as a function of the user modification. The optimal route is then transmitted to a vehicle navigation system that may be installed in a vehicle. The optimal route may be transmitted to the vehicle navigation system using several types of methods including by wireless transmission or direct wire or cable transmission, such as if the vehicle navigation system is capable of being plugged in to a docking station.

The user modifications may be entered using a user input device that may be selected from several different types of user input devices. A road network map may be graphically illustrated on a display that contains a GUI representation of the first optimal route along the road network map. The user modification may be entered by a user closing or selecting at least one node or at least one segment in the road network map. The display may comprise a touch-screen display that allows the user to select the node or segment or the node or segment may be selected by other types of input devices as well.

The closed nodes or segments are avoided when the second optimal route is calculated. The selected nodes or segments are included in the second optimal route that is calculated. An adaptive routing module may be used to allow the user to provide the user modification of the first optimal route. The adaptive routing module may then use the route calculation module to calculate a new optimal route based on the user modifications or may calculate the new optimal route itself. Once the new optimal route is calculated, it may be transmitted to the vehicle navigation system and stored in a memory location of the control unit of the vehicle navigation system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF TIE PREFERRED EMBODIMENTS

Figure 1:
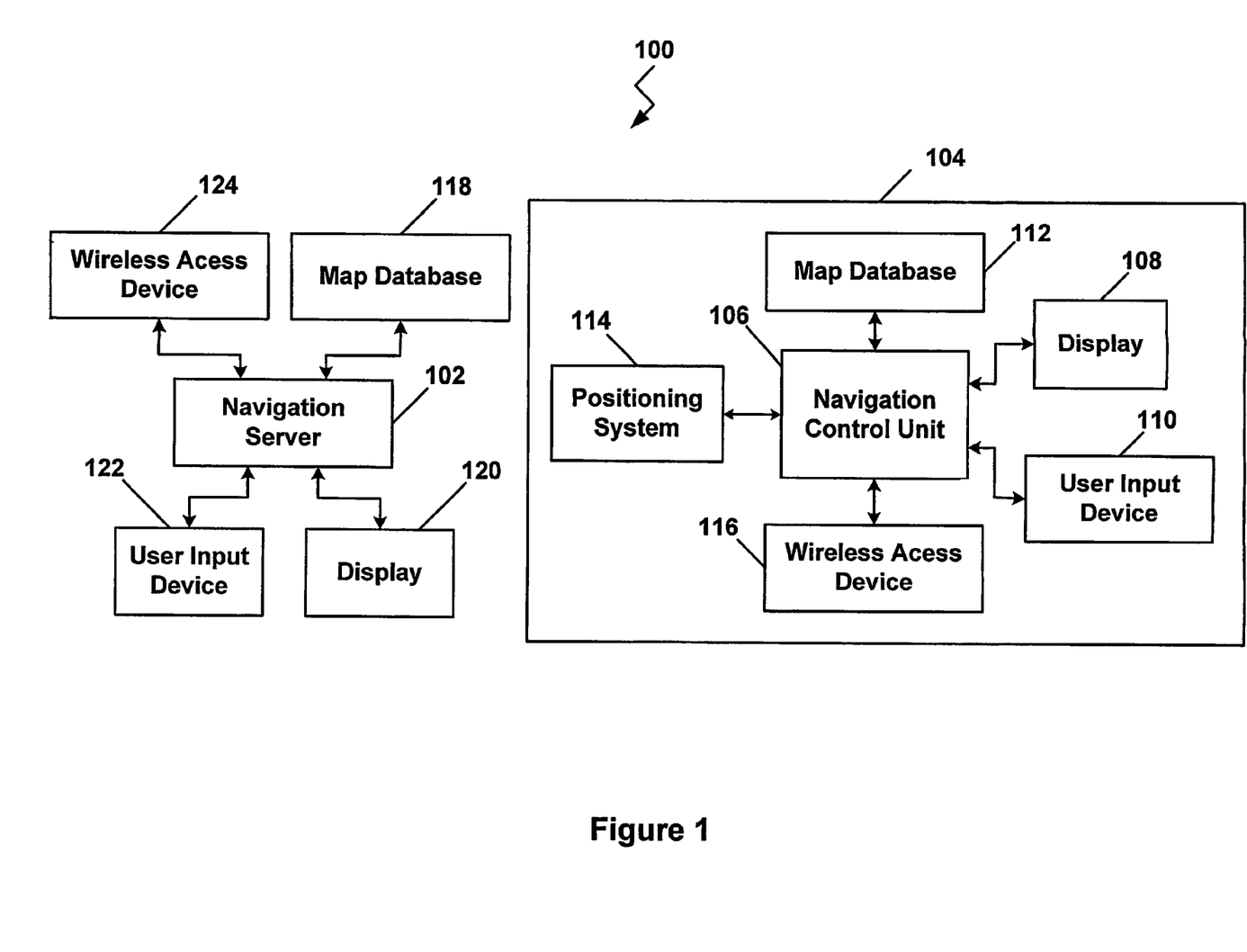
FIG. 1 is a block diagram of a navigation system.

In FIG. 1, a navigation system 100 with an adapted route calculation module capable of determining special routes as a function of user input preferences is disclosed. As illustrated, the navigation system 100 includes a navigation server 102 and a vehicle navigation system 104. The vehicle navigation system 104 includes a vehicle navigation control unit 106 that, along with the navigation server 102, include software modules programmed to calculate routes from points of origin to predetermined destinations. Although not specifically illustrated, the vehicle navigation control unit 106 may include a Central Processing Unit ("CPU"), a system bus, a Random Access Memory ("RAM"), a Read Only Memory ("ROM"), an I/O adapter for connecting peripheral devices such as hard disc drives, CD-ROM drives, a communications adapter, and a display adapter. Those skilled in the art should recognize that various computing devices may be used as the vehicle navigation control unit 106.

The vehicle navigation control unit 106 may be connected with a display 108. In one example navigation system 100, the display 108 may be a touch-screen display that functions as both a display and a user input device. In another example, the navigation control unit 106 may be connected with a user input device 110. The user input device 110 may be a keypad, a personal computer, a laptop computer, a pocket PC, a personal digital assistant, a wireless access device or phone, or any other type of computing device that is capable of allowing a user of the vehicle navigation system 104 to input data during operation.

If the user input device 110 communicates wirelessly with the vehicle navigation control unit 106, both the vehicle navigation control unit 106 and the user input device 110 may be connected with a wireless communication device that is capable of communicating data between the user input device 110 and the vehicle navigation control unit 106. Some illustrative methods of communicating between the user input device 110 and the vehicle navigation control unit 106 include infrared, Bluetooth, wireless LAN, Universal Serial Bus, fiber optic, direct wire, parallel ports, serial ports, and a network connection.

As further illustrated, the vehicle navigation control unit 106 may be connected to a map database 112. The map database 112 may be located or stored on a disc storage device, a CD-Rom, or any other suitable storage medium. The map database 112 may contain a digital map of a road network for various geographic locations as well as other types of data relating to the road network and the geographic area. The map database 112 allows the vehicle navigation control unit 106 to display a map of a geographic location that includes a road network. The vehicle navigation control unit 106 may be used to locate an address or destination using a street address or nearby intersections. In addition, the vehicle navigation control unit 106 can help calculate a travel route, can match sensor-detected vehicle trajectory with a known road network to determine more accurately the actual position of the vehicle; or provide travel information such as travel guides, landmarks, hotel and restaurant information.

The vehicle navigation control unit 106 may also be connected to at least one positioning system 114. The positioning system 114 may be used to determine the geographic location or coordinates of the vehicle, as well as the trajectory of the vehicle. Positioning involves the determination of the geo-coordinates of the vehicle on the surface of the Earth. Knowing the position of the vehicle may enable the vehicle navigation control unit 106 to determine the precise position of the vehicle relative to a road network map. The vehicle navigation control unit 106 may also provide maneuvering instructions to the driver of the vehicle by knowing the geographic location of the vehicle.

Three types of example positioning systems 114 that may be used include a stand-alone system, a satellite-based system, and a terrestrial radio based system. A dead reckoning system is an illustrative stand-alone system that may be used by the vehicle navigation system 104. A satellite-based system that may be used involves equipping the vehicle with a global positioning system ("GPS") receiver or any other type of system that uses satellites to determine geographic locations. A terrestrial radio based system is a system that uses measurement techniques to determine the location of the vehicle. Three commonly used measurement techniques for terrestrial positioning are time of arrival ("TOA"), angle of arrival ("AOA"), and time difference of arrival ("TDOA"). A combination of all of the above-referenced positioning systems, as well as others, may be used in the vehicle navigation system 104.

A wireless access device 116 may be connected with the vehicle navigation control unit 106. The wireless access device 116 may connect the vehicle navigation control unit 106 with the navigation server 102. Route planning, calculation and data storage may be accomplished by the navigation server 102 and then wirelessly transmitted to the vehicle navigation system 104. This represents a server-based solution in which the majority of the processing occurs at the navigation server 102 as opposed to the vehicle navigation control unit 106. The navigation server 102 may transmit data to the vehicle navigation control unit 106 using a wireless data transmission protocol such as WAP or any other suitable transmission protocol.

The navigation server 102 may be connected to a map database 118 that contains a digital map of a road network for various geographic locations as well as other types of travel data or road characteristics, such as road types, road characteristics, road sizes, road weight limits, road travel restrictions (i.e.—hazardous material restrictions), bridge heights or clearance levels, bridge weight limits, bridge widths, construction information, landmark information, business information and so forth. The map databases 112, 118 may be the same for both the navigation server 102 and the vehicle navigation system 104. The navigation server 102 may also be connected with a display 120 that is used to display various types of GUIs to users of the navigation server 102. In addition, the navigation server 102 may be connected with a user input device 122 that enables a user to input various types of data, such as a keyboard or similar device.

The navigation server 102 may also be connected with a wireless access device 124 that allows the navigation server 102 to communicate with the vehicle navigation system 104. The wireless access device 124 of the navigation server 102 and the wireless access device 116 of the vehicle navigation system 104 may communicate wirelessly with each other using any suitable communication protocol. The wireless access devices 116, 124 create a wireless communication system between the navigation server 102 and the vehicle navigation system 104. As routes are calculated on the navigation server 102, the routes may be transmitted to the vehicle navigation system 104.

Figure 2:
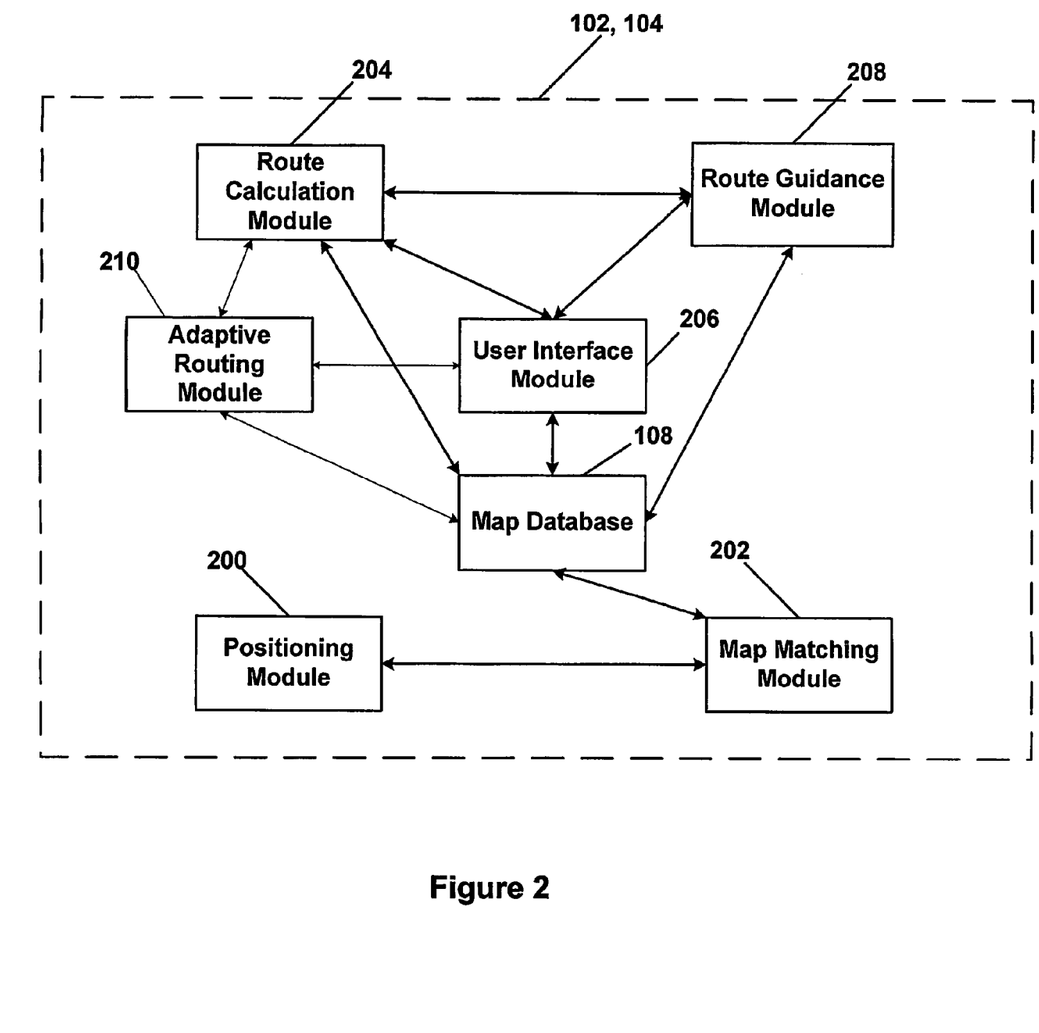
FIG. 2 is a block diagram of application modules located on the vehicle navigation system.

In FIG. 2, the vehicle navigation control unit 106 includes a digital map database 112. The digital map database 112 contains map information in a predefined format that may be capable of being accessed and used by the navigation control unit 106. As set forth above, the navigation server 102 also includes a digital map database 118 that contains similar information. The navigation server 102 and the vehicle navigation control unit 106 are capable of using the map information for map related functions such as identifying and providing locations, road classifications, road names, traffic regulations, travel information and so forth. The map databases 112, 118 also contain a road network map of various geographic locations. The road network maps include nodes and segments that make up roads that are used by vehicles to travel to predetermined destinations. Nodes and segments as used herein may be referred to as map segments.

A positioning module 200 may be included on the navigation control unit 106 to determine the geographic location and trajectory of the vehicle using the positioning device 114. Several different positioning devices 114 may be used to determine the trajectory and geographic position of the vehicle. The positioning module 200 may include an integration algorithm that uses output signals generated by the positioning device 114 to determine the geographic location and trajectory of the vehicle.

Once the geographic location and trajectory of the vehicle have been determined, a map-matching module 202 may be used to match the geographic location of the vehicle with a position on the road network map generated with the map database 112. A map-matching algorithm of the map-matching module 202 may be used to place the vehicle in the proper location on the road network map. The map-matching module 202 may correlate the vehicle position and trajectory as a function of inputs from the positioning device 114 to the road network map by comparing the vehicle trajectory and location with the routes present in the map database 112.

The navigation server 102 and the vehicle navigation control unit 106 may also include a route calculation module 204. Route calculation is the process of planning a route prior to or during a trip to a predetermined destination. The route calculation module 204 may use a shortest path algorithm or technique to determine a recommended route from a trip origin to a trip destination. Several different shortest path algorithms and variations of shortest path algorithms and techniques may be used by the navigation system 100.

The shortest path algorithm or technique may also include a route optimization module that uses planning criteria to plan the route. The quality of any given route may depend on many factors and selection criteria such as distance, road types, speed limits, vehicle location, number of stops, number of turns and traffic information. The route selection criteria can either be fixed at manufacture or may be implemented through a user interface module 206. Determination of the best route may use the selection criteria and a digital road network map retrieved from the map databases 112, 118 to minimize distance and travel time. The navigation system 100 allows vehicle users to compute routes interactively by opening or closing nodes or segments in the road network map as well as based on different types of vehicle characteristics.

As illustrated in FIG. 2, the navigation server 102 and the vehicle navigation control unit 106 may also include a user interface module 206. The user interface module 206 may generate a GUI on the displays 108, 120. The user interface module 206 may enable a user to interact with the navigation system 100 and enter inputs into the navigation system 100. The user interface module 206 may receive inputs from the display 108 if it is a touch-screen display. The user input devices 110, 122 may also be used to enter inputs into the user interface module 206. The user inputs may be transmitted to the route calculation module 204.

The vehicle navigation control unit 106 may also include a route guidance module 208. The route guidance module 208 may be used to guide the driver or user along the route generated by the route calculation module 204. The route guidance module 208 may use the positioning module 200, the map database 112, and the map-matching module 202 to guide the driver along the route to the respective destination. The route guidance module 208 may also allow the user interface module 206 to generate a road network map GUI on the display 108 of the vehicle navigation system 104. The road network map GUI may illustrate where the vehicle is located on a road network map and the direction the vehicle is traveling.

The navigation server 102 and the vehicle navigation control unit 106 may also include an adaptive routing module 210. As set forth above, the route calculation module 204 may be used to calculate the shortest route between a trip origin and a trip destination. The adaptive routing module 210 allows the user or driver of the vehicle to adjust the route that has been calculated by the route calculation module 204 as a function of user preferences. In one example navigation system 100, the adaptive routing module 210 may enable the user to open or close nodes and segments in a road network map. An "open" node or segment may be utilized by the route calculation module 204 during route calculation, but a "closed" node or segment may not be utilized. Once the nodes or segments have been opened or closed, the adaptive routing module 210 may pass this information to the route calculation module 204, which then may re-calculate a new route to the destination as a function of the user preferences. The adaptive routing module 210 may calculate the new route of the vehicle.

The adaptive routing module 210 may allow the driver or user to adjust the route based upon user preferences that may relate to road attributes or vehicle characteristics. The driver may want to avoid certain roads or segments based upon vehicle weight or cargo restrictions and so forth. For example, a driver may want to avoid any overpasses that do not provide at least four meters of height clearance. As such, as a function of these user input preferences about road attributes, the adaptive routing module 210 may also calculate the new route to avoid roads that have bridges that do no provide at least four meters of clearance. The vehicle characteristic may be selected from a group of vehicle characteristics including a vehicle type, a cargo type, a vehicle size, a cargo size, a vehicle height, a cargo height, and a vehicle weight.

Figure 3:
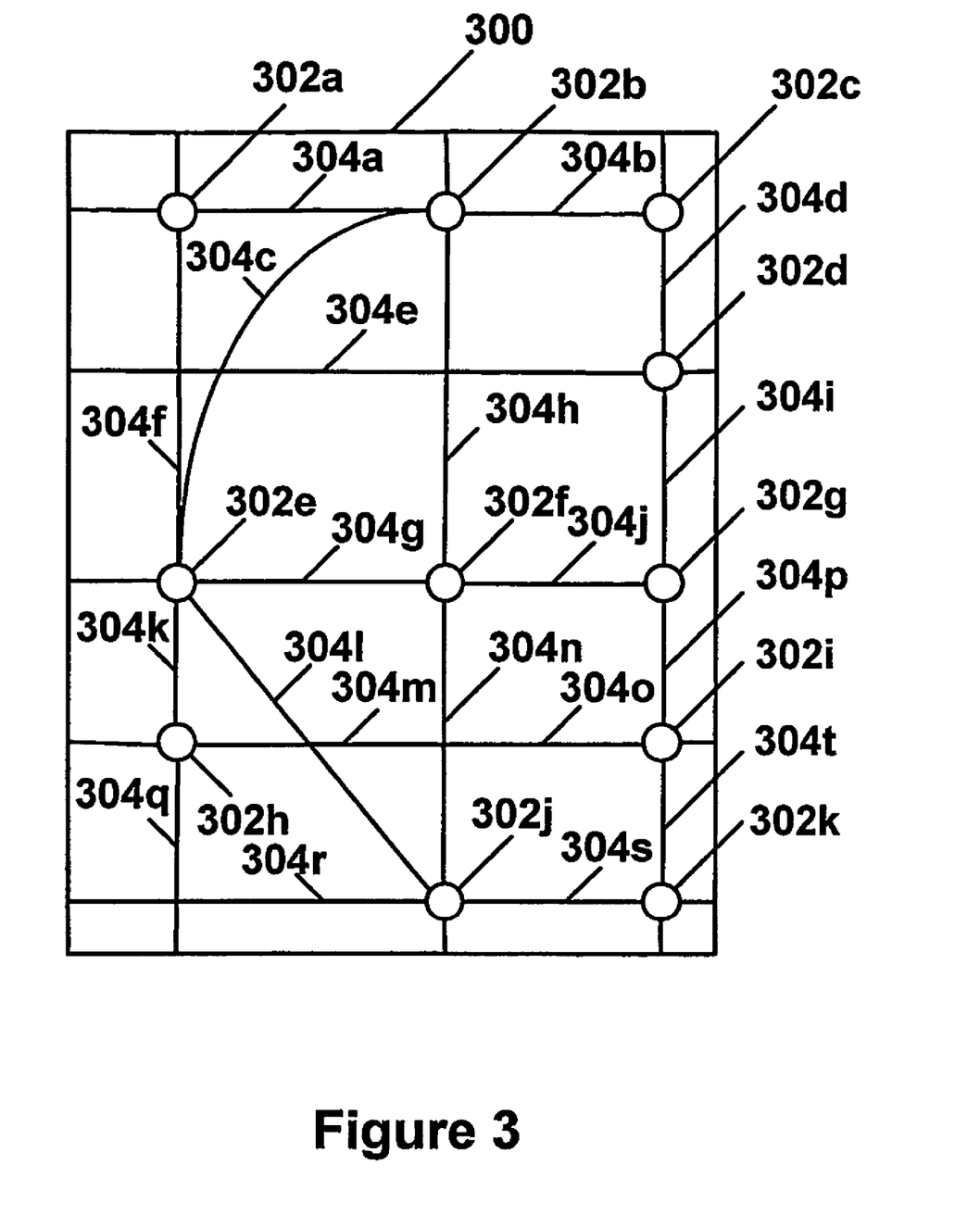
FIG. 3 is an illustrative road network generated by the vehicle navigation system.

In FIG. 3, an illustrative digital road network map 300 is set forth that may be stored in the map databases 112, 118. As previously disclosed, one function of the map databases 112, 118 is to provide a road network map that is capable of being displayed on the displays 108, 120. The map databases 112, 118 may also include several attributes about the roads contained in the map such as geo-coordinates, street names, types of roads, address ranges, overpass information (clearance height), cargo restrictions, road connection information, intersection information, turn restrictions and so forth. This information is used by the route calculation module 204 to determine the route from the trip origin to the trip destination.

The illustrative road network map 300 includes a plurality of nodes 302*a-k* and a plurality of segments 304*a-t*. The nodes 302*a-k* represent a cross point or an endpoint of a street/road and is used to represent an intersection or an end of a road. The segments 304*a-t* are used to represent a piece or stretch of roadway between two or more nodes 302*a-k*. For the purpose of the disclosed system, the segments 304*a-t* may be straight segments or shaped segments.

The adaptive routing module 210 may allow the driver or user of the navigation system 100 to close or open certain nodes 302*a-k* or segments 304*a-t* located on the road network map 300. After the user closes or opens nodes 302*a-k* or segments 304*a-t*, the route calculation module 204 or the adaptive routing module 210 may compute or calculate a route in conformity with the guidelines input by the driver or user. The route may then be stored in a memory location of the navigation server 102 or the vehicle navigation control unit 106. As such, the next time the user seeks a route to the same destination from the same point of origin, the navigation system 100 will be able to retrieve the user preferred route from the memory location.

As set forth generally above, the navigation system 100 allows users to close or open predetermined nodes 302*a-k* or segments 304*a-t* located in the road network map 300. A segment 304*a-t* to be closed or opened can consist of portions of different roads. These segments, in their course, may incorporate crossings or junctions from other roads. The adaptive routing module 210 can be setup to allow the vehicle to cross a closed segment 304*a-t* if so desired.

The adaptive routing module 210 may subdivide a closed segment 304*a-t* into definite parts with two nodes 302*a-k* defining each closed segment 304*a-t*. The adaptive routing module 210 determines the geo-coordinates of the nodes 302*a-k* and uses them to compute the route. A definite segment 304*a-t* prevails if it does not exhibit a junction or a crossing. Closing a respective node 302*a-k* may close several segments 304*a-t* connected with the node 302*a-k*. The segment 304*a-t* to be closed may be computed from the received geo-coordinates. The route calculation module 204 may receive inputs from the adaptive routing module 210 or the adaptive routing module 210 may be included as a sub-routine of the route calculation module 204.

Figure 4:
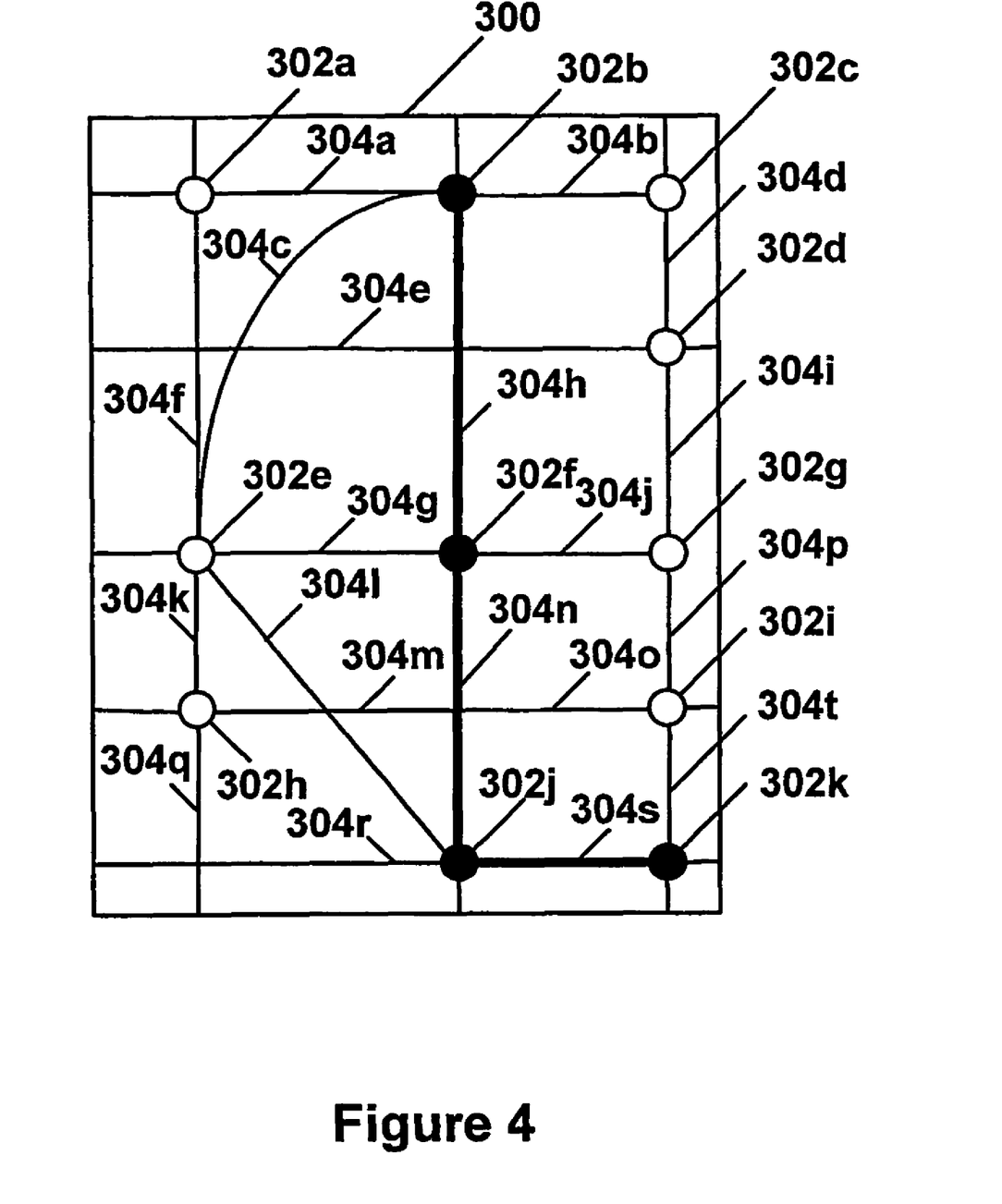
FIG. 4 is an illustrative road network with a first route calculated between a trip origin and a trip destination.

In FIG. 4, as an example only, the user or driver of the vehicle may want to travel from node 302*k* to node 302*b*. Node 302*k* is input as the trip origin and node 302*b* is input as the trip destination. The trip origin and the trip destination may also be input as addresses or the trip origin may be computed automatically as a function of the current location of the vehicle. As a function of these inputs, the route calculation module 204 may calculate the optimal route from node 302*k* to node 302*b*. As an example, the route calculation module 204 may initially determine that the fastest or shortest route to node 302*b* from node 302*k* is to travel from node 302*k* to node 302*j* using segment 304*s*, from node 302*j* to node 302*f* using segment 304*n*, and then from node 302*f* to node 302*b* using segment 304*h*. As such, this route is presented as the optimal route for the driver of the vehicle. This route may be generated first on the display 120 of the navigation server 102 as the user is planning the trip using the navigation server 102. The route may also be generated on the display 108 of the vehicle navigation system 104.

After the route calculation module 204 calculates the first route, the adaptive routing module 310 may provide the driver with an option of modifying the route by entering driver or user preferences. The user may be allowed to modify the route by opening or closing respective nodes 302*a-k* that are contained in the road network map 300. The user preferences may be entered using the user input device 122 of the navigation server 120 through a web-based interface or application window. Alternatively, the user preferences may be entered using the display 104 if it is a touch-screen display, or may be entered through the user input device 106 of the vehicle navigation system 104. As an example, the vehicle the driver is using may be too large to negotiate an overpass that is located at node 302*f*. The driver is therefore allowed to close node 302*f*, and the route calculation module 204 may compute a new route as a function of this driver preference. Likewise, the user is also able to select nodes 302*a-k* so that the route calculation module 204 includes the selected nodes 302*a-k* in the route.

Although not specifically illustrated, the adaptive routing module 210 may also allow the user to enter modifications to the route based on vehicle characteristics. A GUI interface may be presented to the user that provides the user with selection fields or input fields that allow the user to select options or input data based on the vehicle's characteristics. The vehicle characteristic may be selected from a group of vehicle characteristics including a vehicle type, a cargo type, a vehicle size, a cargo size, a vehicle height, a cargo height, a vehicle weight and so forth. The types of characteristics that are presented to the user may be designed such that they are tailored to specific types of vehicles. For example, the adaptive routing module 210 designed for use in a cargo truck may be different than those designed for passenger vehicles or business vehicles.

Figure 5:
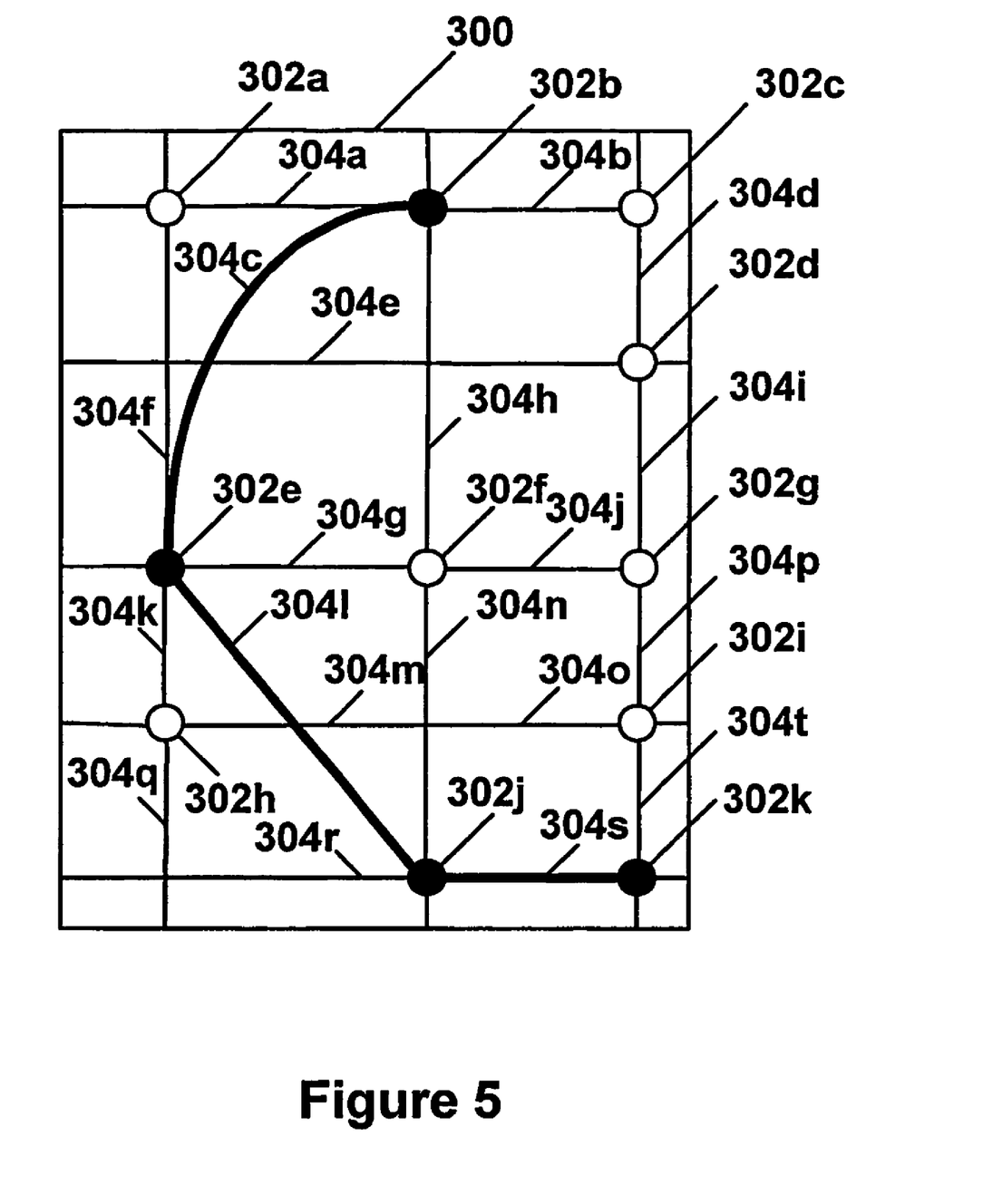
FIG. 5 depicts the road network illustrated in FIG. 4 with an adapted route calculated between the trip origin and the trip destination as a function of user inputs.

In FIG. 5, an illustrative new optimal route that has been calculated by the route calculation module 204 or the adaptive routing module 210 as a function of the driver preference set forth above is depicted. The new route to node 302*b* from node 302*k* takes the vehicle to node 302*j* using segment 304*s*, from node 302*j* to node 302*e* using segment 304*l*, and from node 302*f* to node 302*b* using segment 304*c*. As such, the new route has avoided node 302*f* as requested by the driver of the vehicle through entered user preferences. The driver may also be allowed to close certain paths of a node 302*a-k*, instead of the entire node 302*a-k*, such as only traveling on a certain street in a certain direction.

In yet another illustrative navigation system 100, the driver is allowed to open or close respective segments 304*a-s* of the road network map 300. Using the previous example, the driver of the vehicle wants to travel from node 302*k* to node 302*b*. The route illustrated in FIG. 4 is initially generated as the first preferred route by the route calculation module 204. However, the driver of the vehicle would like to avoid segment 304*h*, segment 304*n* and segment 304*g* for example. In this example the driver of the vehicle is allowed to open or close respective segments 304*a-t*, thereby allowing the driver to avoid respective road segments that are not desirable. The driver is also capable of selecting segments 304*a-s* to be included in the route that is calculated.

The driver of the vehicle may not want to use segments 304*h*, 304*n* and 304*g* because these particular road segments may be part of a neighborhood area that the vehicle the driver is driving cannot traverse without great difficulty. There may be several different reasons why the driver of the vehicle might want to avoid particular nodes 302*a-k* or segments 304*a-t*. The exact reason why a particular driver may want to avoid or use a particular segment 304*a-t* is irrelevant for the purpose of the disclosed system as it is directed toward providing a vehicle navigation system 100 that is capable of providing routes that have been adapted by the user as a function of the selection or avoidance of particular nodes 302*a-k* or segments 304*a-t* of road network maps as well as based upon user preferences.

In order to avoid segments 304*h*, 304*n* and 304*g* the driver of the vehicle may use the display 104 or the user input device 106 to select the segments to be closed. After the driver has selected the respective segments to be closed or avoided, the route calculation module 204 recalculates a new route that avoids segments 304*h*, 304*n* and 304*g*. The route illustrated in FIG. 5 is an illustrative new route for this example as well.

In the example set forth above, the segments 304*h*, 304*n* and 304*g* that are closed include respective nodes that are connected with the segments 304*h*, 304*n* and 304*g* to be closed. The route calculation module 204 or adaptive routing module 210 may allow the driver of the vehicle to travel through nodes that may be connected with the segments 304*h*, 304*n* and 304*g* that are closed. Passing through a node is equivalent to a "via" target. Passing through a specific segment corresponds to a successively joined number of "via" sections. These "via" sections comprise successively joined elements of received geo-coordinates that are related to the road network map.

In FIG. 1, the navigation system 100 may use the navigation server 114 to calculate the routes and pass them on to the navigation control unit 106 of the vehicle navigation system 104. The driver of the vehicle may enter a trip origin and a trip destination using the navigation server 102. The navigation server 102 may then calculate a route with the route calculation module 204 and the adaptive routing module 210 and transmit the data for that route back to the navigation control unit 102. As such, the map database 118, the map matching module 202, the route calculation module 204, and the adaptive routing module 210 of the navigation server 114 are employed by a user of the navigation server 102. The user may select or close respective nodes 302*a-k* or segments 304*a-t* and the navigation server 102 will a route as a function of the driver preferences.

The driver preferences may be entered before the first route is calculated by the route calculation module 204. The driver of the vehicle may close or select nodes 302*a-k* or segments 304*a-t* that are to be avoided before the route calculation module 204 calculates a route. The user may also enter user preferences as a function of several attributes as set forth above. The adaptive routing module 210 may calculate a route as a function of these settings.

Once the user has obtained a satisfactory route, the user may use the wireless access device 124 of the navigation server 102 to transmit the route to the vehicle navigation system 104. The vehicle navigation control unit 106 may receive the route from the navigation server 102 through the wireless access device 116, which is located in the vehicle navigation system 104. The vehicle navigation system 104 may be located in a vehicle that may be about to travel using the route. The route may be stored in a memory location of the vehicle navigation system 104 and presented to the user through a menu-based GUI system that allows the user to select the route when desired. All of the interfaces used in the navigation system 100 may be presented in a browser environment by using a web browser located in the vehicle.

Another aspect of the present invention is that since the adaptive routing module 210 may be located in the vehicle navigation system 100, the user may also be allowed to enter modifications during the route to the destination. As such, as the user is traveling to the destination, the user may modify the route based on various types of circumstances. Some illustrative circumstances may relate to traffic conditions, construction conditions, weather conditions and so forth.

Figure 6:
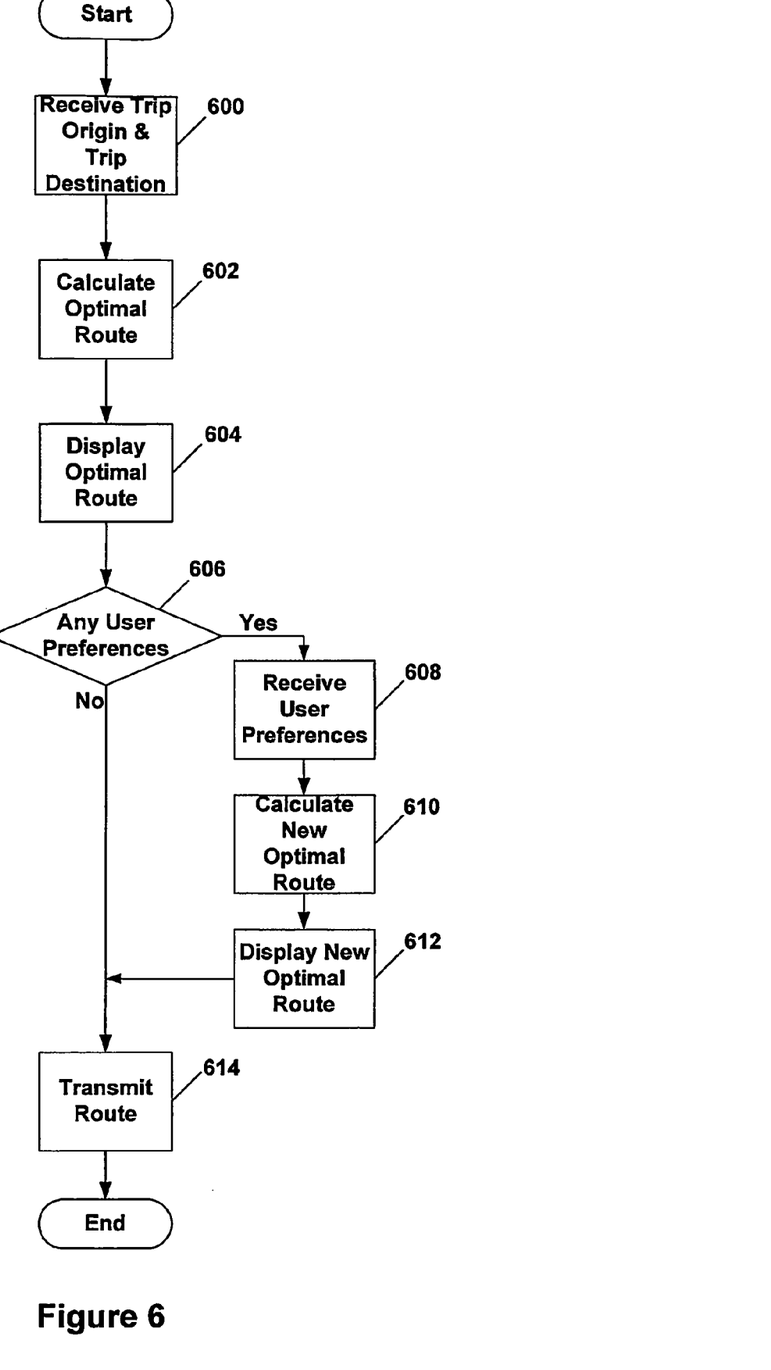
FIG. 6 is a flow chart illustrating exemplary method steps taken by the vehicle navigation system during route calculation.

In FIG. 6, an illustrative flow chart is set forth that illustrates how the navigation system 100 may be used to calculate routes to predetermined destinations. At block 600, a user or driver may enter a trip origin and a trip destination. The user interface module 206, the display 104 and the user input device 122 may be used to enter these values. The trip origin may already be known as a function of the current geographic location of the vehicle in which the vehicle navigation system 104 is installed.

Once the trip destination has been determined, an optimal route to the destination may be calculated by the route calculation module 204 at block 602. The shortest or fastest path may be calculated in this instance. At block 604, the optimal route may be displayed to the user. The driver or user of the vehicle may be presented with an option of entering driver preferences to the predetermined destination at block 606. These driver preferences allow the user to open or close certain nodes 302*a*-*k* or segments 304*a*-*t* of the road network map 300 that is presented to the user. In addition, the user may enter user preferences based on different types of vehicle characteristics.

If the user wants to calculate an adaptive route based upon user preferences, the user enters these user preferences at block 608. The user may enter these preferences by opening or closing nodes 302*a*-*k* and segments 304*a*-*t* as well as by entering certain user attributes or qualifications about the path to the destination or the vehicle. At step 610, the adaptive routing module 210 may provide the user inputs to the route calculation module 204, which then calculates a new optimal route as a function of the user inputs and preferences. The adaptive routing module 210 may also be operable to calculate the new optimal route. The new optimal route may be generated and displayed on the display 120 of the navigation server 102 at block 612. If the new optimal route is acceptable, at block 614 the new optimal route may be transmitted to the vehicle navigation system 104. The user is also allowed to modify the route using the vehicle navigation system 104.

Another aspect of the invention involves computing a normal route to a destination with the navigation server 102. Alternatively, the vehicle navigation system 104 may determine the route to the destination. As such, in order to save time and shorten the amount of data that needs to be transferred to the vehicle navigation system 104, the navigation server 102 may use the adaptive routing module 210 to compute an adaptive route. The navigation server 102 may then determine the differences between the original route and the adaptive route. The differences between the original route and the adaptive route may be transferred to the vehicle navigation system 104. The vehicle navigation system 104 may use the differences to determine the adapted route. Therefore, only the changes that are made to the normal route by the adaptive routing module 210 may be sent to the vehicle navigation system 104, which saves time and costs by shortening the amount of data that needs to be transferred to the vehicle navigation system 104 from the navigation server 102.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A navigation system comprising:
   an input device connected with a navigation server, where the input device is configured to allow a user to enter a trip destination;
   a route calculation module executable on the navigation server to calculate a first route to the destination;
   a display for displaying the first route on a road network map that includes a plurality map elements, where a map element is a node or a segment, where the node is representative of a road intersection or an end of a road and the segment is representative of a portion of a road segment between two nodes, and where the first route is transmitted to the display so as to be displayed to the user; and
   an adaptive route calculation module executable on the navigation server to receive a user modification of the first route from the input device, where the user modification includes a first user selection to open a first node or segment and a second user selection to close a second node or segment in the road network map, where a second route from a current location to the trip destination is calculated with the adaptive route calculation module as a function of the user modification to include the opened first node or segment in the second route and to exclude the closed second node or segment from the second route;
   and where the second route is transmitted to a vehicle navigation system.

2. The navigation system of claim 1 where the second route is stored in the vehicle navigation system.

3. The navigation system of claim 1 where the adaptive route calculation module is configured to calculate the second route through a common node shared by two segments selected for closure.

4. The navigation system of claim 1 where the user modification comprises at least one vehicle characteristic, and where the navigation system is configured to calculate the second route based on the at least one vehicle characteristic.

5. The navigation system of claim 4 where the vehicle characteristic may be selected from a group of vehicle characteristics including a vehicle type, a cargo type, a vehicle size, a cargo size, a vehicle height, a cargo height, and a vehicle weight.

6. The navigation system of claim 1 where the second route is transmitted to the vehicle navigation system from the navigation server using a wireless communication system.

7. The navigation system of claim 1 where the second route is stored in the vehicle navigation system as a preferred route.

8. A navigation system comprising:
   a navigation server connected with an input device;
   a user interface module executable by the navigation server to allow a user to enter a destination with the input device;
   a route calculation module executable by the navigation server to calculate a first route to the destination that is generated on a road network map that includes a plurality of map elements;
   an adaptive route calculation module executable by the navigation server to allow the user to enter a user modification of the first route with the input device, where the user modification includes a user selection of at least one map element in the road network map, where a second route to the destination is calculated with the adaptive route calculation module as a function of the user modification; and a wireless communication system connected with the navigation server and a vehicle navigation system, where the second route is transmitted to the vehicle navigation system using the wireless communication system, and where the second route is stored in the vehicle navigation system as a preferred route.

9. A navigation system comprising:

a navigation server comprising a processor and a memory, where the memory includes a plurality of stored instructions executable by the processor to cause the processor to:

calculate a first route to a trip destination, where the first route is generated on a road network map that includes a plurality of map elements;

receive a user modification of the first route where the user modification includes a user selection of at least one map element;

calculate a second route to the trip destination as a function of the user modification; and transmit the second route to a vehicle navigation system.

10. The navigation system of claim 9 where the user-selected map element is not included in the second route.

11. The navigation system of claim 9 where the plurality of stored instructions are executable by the processor to further cause the processor to:

receive the user modification of the first route where the user modification further includes a vehicle characteristic; and calculate the second route to the trip destination as a function of the vehicle characteristic.

12. The navigation system of claim 11 where the plurality of stored instructions are executable by the processor to further cause the processor to:

receive the user modification of the first route where the user modification further includes the vehicle characteristic selected from a group of vehicle characteristics including a vehicle type, a cargo type, a vehicle size, a cargo size, a vehicle height, a cargo height, and a vehicle weight.

13. The navigation system of claim 9 where the selected map element is included in the second route.

14. A navigation system comprising:

a navigation server connected with an input device;

a user interface module executable by the navigation server to allow a user to enter a destination with the input device;

a route calculation module executable by the navigation server to calculate a first route to the destination that is generated on a road network map that includes a plurality of map elements;

an adaptive route calculation module executable by the navigation server to allow the user to enter a user modification of the first route with the input device, where the user modification includes a user selection of at least one map element in the road network map, where a second route to the destination is calculated with the adaptive route calculation module as a function of the user modification; and a wireless communication system connected with the navigation server and a vehicle navigation system, where at least a portion of the second route is transmitted to the vehicle navigation system using the wireless communication system, where the at least a portion of the second route is stored in the vehicle navigation system.

15. The navigation system of claim 14 where the at least a portion of the second route includes the entire second route.

16. The navigation system of claim 14 where the at least a portion of the second route comprises the difference between the first route and the second route.

17. The navigation system of claim 14 further comprising a second adaptive route calculation module executable by the vehicle navigation system to allow a user to modify the second route.

18. The navigation system of claim 14 where the adaptive route calculation module is further executable by the navigation server to allow the user to enter a second user modification of the first route with the input device, where the second user modification is based on a vehicle characteristic.

19. The navigation system of claim 18 where the vehicle characteristic may be selected from a group of vehicle characteristics including a vehicle type, a cargo type, a vehicle size, a cargo size, a vehicle height, a cargo height, and a vehicle weight.

20. A navigation system comprising:

an input device connected with a navigation server the input device operable to allow a user to enter a trip destination;

a route calculation module operable to calculate a first route to the trip destination;

a display for displaying the first route on a road network map that includes a plurality of map elements; and an adaptive route calculation module operable to receive a user modification of the first route from the input device, where the user modification includes a user selection of at least one map element in the road network map, where a second route is calculated by the adaptive route calculation module as a function of the user modification; where the adaptive route calculation module is operable to determine differences between the first route and the second route, and where differences between the first route and the second route are transmitted to a vehicle navigation system.

21. The navigation system of claim 20 where the vehicle navigation system includes a second adaptive route calculation module operable to modify the second route from a current location to the trip destination.

* * * * *